United States Patent
Yoon (10) Patent No.: US 7,552,143 B2
(45) Date of Patent: Jun. 23, 2009

(54) METHOD AND SYSTEM FOR PROVIDING MULTIMEDIA CONTENT TO MULTIPLE CLIENTS

(75) Inventor: Jong-Luk Yoon, Seoul (KR)

(73) Assignee: KT Corporation (KR)

( * ) Notice: Subject to any disclaimer, the term of this patent is extended or adjusted under 35 U.S.C. 154(b) by 0 days.

(21) Appl. No.: 11/510,538

(22) Filed: Aug. 24, 2006

(65) Prior Publication Data

US 2007/0180486 A1    Aug. 2, 2007

Related U.S. Application Data

(63) Continuation of application No. PCT/KR2005/003407, filed on Oct. 13, 2005.

(30) Foreign Application Priority Data

Oct. 13, 2005    (KR)    ............. 10-2005-0096316

(51) Int. Cl.
  *G06F 7/00*    (2006.01)
  *G06F 17/00*   (2006.01)
(52) U.S. Cl. .................. 707/104.1; 455/3.06
(58) Field of Classification Search ........... None
See application file for complete search history.

(56) References Cited

U.S. PATENT DOCUMENTS 6,487,390 B1 *  11/2002  Virine et al. ............... 455/3.01
6,697,792 B2 *   2/2004  Bunney et al. ................ 707/1
7,089,309 B2 *   8/2006  Ramaley et al. ............ 709/226
2003/0105925 A1 *  6/2003  Yoshimura et al. .......... 711/118

FOREIGN PATENT DOCUMENTS

| KR | 10-2001-0109040 A | 12/2001 |
| KR | 10-2002-0065112 A | 8/2002 |
| KR | 10-2002-0078320 A | 10/2002 |
| KR | 10-2005-0000117 A | 1/2005 |
| KR | 10-2005-0079175 A | 8/2005 |
| WO | WO 99/22502 | 5/1999 |

* cited by examiner

Primary Examiner—John E Breene
Assistant Examiner—Aleksandr Kerzhner
(74) Attorney, Agent, or Firm—Knobbe, Martens Olson & Bear, LLP

(57) ABSTRACT

A method for supplying multimedia contents to a plurality of clients is implemented by a system which includes a plurality of contents distribution networks provided with a plurality of local centers and a central center connected to the local centers of each contents distribution network to receive contents of a plurality of contents providers in each nations, wherein the contents distribution networks are prepared according to each nation and the plurality of contents providers are linked to the plurality of clients. The method includes the steps of: receiving contents from a plurality of contents providers of a corresponding nation according to a predetermined period by the local centers; receiving the contents from the local centers of each contents distribution network by the central center; and supplying the contents to each client.

16 Claims, 8 Drawing Sheets

METHOD AND SYSTEM FOR PROVIDING MULTIMEDIA CONTENT TO MULTIPLE CLIENTS

CROSS-REFERENCE TO RELATED APPLICATIONS

This application is a continuation under 35 U.S.C. §365(c) of PCT Application No. PCT/KR2005/003407, filed Oct. 13, 2005 and designating the United States. Further, this application claims the benefit of the earlier filing date of Korean Patent Application No. 10-2005-0096316, filed Oct. 13, 2005. The PCT Application No. PCT/KR2005/00347 and Korean Patent Application No. 10-2005-0096316 are incorporated herein by reference in their entirety.

BACKGROUND

1. Field

The present invention relates to a method and a system for supplying multimedia contents to a plurality of clients linked to a network.

2. Description of Related Technology

As the information communication becomes speedier, the Internet is now considered as new media in which a single information source can provide various types of services. Now multimedia contents from various air broadcasting channels and Internet service businesses are serviced using the Internet.

However, in these Internet broadcasting services, users have to access each broadcasting sources or channels in order to receive broadcast programs, i.e., multimedia contents. For example, to receive broadcast programs from other countries, users have to individually connect to web sites of each broadcasting station and select desired broadcast programs from such websites. Further, in certain countries or air broadcasting stations, broadcast programs may not be available via the Internet, or the quality of services may be poor.

Korean Patent Publication No. 10-2005-0079175 discloses a method and a system for providing a broadcast service, which integrates broadcast programs from many distributed broadcast program providers and delivers them in one channel. In this method, a broadcasting schedule is created and various programs are formed to be broadcast in one channel according to the broadcasting schedule. In this method, the broadcasting schedule is created by the service provider without an input from users, and users may not have the opportunity to select certain desired contents.

Korean Patent Publication No. 10-2002-0065112 disclosed a method for supplying a multimedia Internet service, in which air broadcast programs and multimedia contents are supplied to an Internet web hosting site and stored in a database thereof. In this method, users connect to the web site, and can search for desired programs in the database and play programs in the database. In this method, the broadcast programs may not be available real-time, and therefore, it may not be suitable for certain programs like news programs.

SUMMARY

One aspect of the invention provides a method for providing multimedia contents to a plurality of clients through a system comprising a plurality of local contents distribution networks and a central server. Each local content distribution network comprises a local server connected to a plurality of contents providers and a plurality of clients in a nation. The central server is connected to the plurality of local servers. The method comprises: periodically receiving, by a local server, multimedia contents from a plurality of contents providers in a nation at predetermined intervals; receiving, by the central server, the multimedia contents from the local server; and supplying the multimedia contents to a plurality of clients.

Another aspect of the invention provides a method for providing multimedia contents supplied from a plurality of contents providers to a plurality of clients through a network. The method comprises: (a) receiving multimedia contents from a plurality of contents providers; (b) storing the received multimedia contents; (c) processing the received multimedia contents in accordance with attributes or instructions of a client; (d) receiving a request from the client for supplying a piece of multimedia content among the multimedia contents; and (e) supplying the requested piece of multimedia content to the client.

In the foregoing method, the step (c) may comprise providing an integrated multimedia content produced from the received multimedia contents the in accordance with a predetermined method. The integrated multimedia content may be configured in a format in which a plurality of pieces of multimedia contents is simultaneously displayed. The step (d) may comprise receiving a request for one of the plurality of pieces of multimedia contents that are simultaneously displayed on a screen. The integrated multimedia content may comprise a portion selected from each of the multimedia contents, and wherein the selected portions are configured to be sequentially displayed. The predetermined method may be derived from the client.

Still in the foregoing method, the step (d) may comprise: (d-1) receiving and storing schedule information which may comprise identification of the requested piece of multimedia content and time for supplying the requested piece of multimedia content; and (d-2) determining whether conditions in the schedule information are accomplished. The step (e) may comprise: (e-1) searching for the requested piece of multimedia content among the stored multimedia contents; (e-2) supplying the requested piece to the client; and (e-3) if the requested piece is not located from the stored multimedia contents, notifying such to the client. The step (d) may comprise receiving information about a device of the client on which the requested piece is to be played, and wherein the step (e) may comprise configuring the requested piece of multimedia content into a form that the client's device can play.

A further aspect of the invention provides a method for providing multimedia contents to a client via a network comprising a plurality of contents distribution networks. A plurality of contents providers and a plurality of clients are connected to at least one contents distribution network. The method comprises: (a) receiving, by a local server of each contents distribution network, multimedia contents from a plurality of contents providers connected thereto; (b) transmitting, by each local server, the received multimedia contents to a central server; (c) processing, by the central server, the transmitted multimedia contents in accordance with attributes or instructions of a plurality of clients, thereafter broadcasting a processed result to each local server, and wherein each local server supplies the processed result to a plurality of clients connected thereto; (d) receiving a request for supplying a piece of multimedia content from one of the plurality of clients; and (e) supplying the requested piece of multimedia content to the requesting client.

In the immediately foregoing method, the step (c) may comprise producing an integrated multimedia content using a predetermined method. The integrated multimedia content may comprise a plurality of pieces of multimedia contents that are to be simultaneously displayed. The step (d) may comprise receiving a request for one of the plurality of pieces of multimedia contents that are simultaneously displayed. The integrated multimedia content may comprise a portion selected from each of the multimedia contents, and wherein the selected portions are configured to be sequentially displayed.

Still in the foregoing method, the step (e) may comprise: (e-1) determining whether the requested piece is stored in an edge server within the contents distribution network to which the client is connected; (e-2) if the requested contents are stored in the edge server, supplying the stored the requested piece from the edge server to the client. The step (e) may comprise: (e-3) if the requested piece is not stored at any edge servers, determining whether the requested piece is stored in a server in another contents distribution network, if the requested content is stored in the other contents distribution network, wherein the requested piece may be supplied from the other contents distribution network to the client. The step (d) may comprise receiving information about a device of the client on which the requested piece is to be played, and wherein the step (e) may comprise configuring the requested piece of multimedia content into a form that the client's device can play.

BRIEF DESCRIPTION OF THE DRAWINGS

The above and other features of the present invention will become apparent from the following description of embodiments given in conjunction with the accompanying drawings, in which.

DETAILED DESCRIPTION OF EMBODIMENTS

Figure 1:
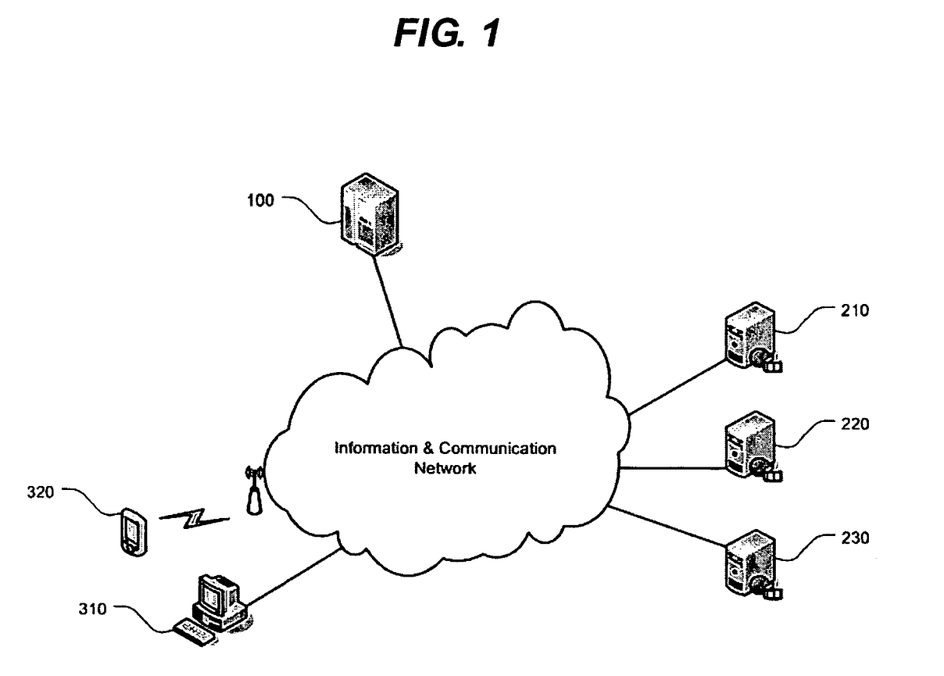
FIG. 1 illustrates a network diagram in accordance with an embodiment of the present invention.

Referring to FIG. 1, network connections in accordance with an embodiment are illustrated. A multimedia contents supplying system 100 is connected to a plurality of contents providers 210, 220, 230 and a plurality of clients 310, 320 through an information communication network.

The term of the information communication network is a broad and general term referring to any data communication networks. The information communication network includes not only wireless communication networks such as mobile communication networks and satellite communication networks but also broadband communication networks.

The multimedia contents supplying system 100 receives contents from a plurality of contents providers 210, 220 and 230. The multimedia contents supplying system 100 then reconstruct or modify the received contents in accordance with instructions or attributes of the subscribers or the terminals of the subscribers. The multimedia contents supplying system 100 provides the reconstructed contents to the terminals 310 and 320 of the subscribers. The parts and elements of the multimedia contents supplying system 100 will be described later with reference to FIG. 2.

The contents providers 210, 220 and 230 may include air channel broadcasting stations and Internet broadcasting stations. More generally, the contents providers 210, 220 and 230 may be any sources that can supply multimedia contents including audio and video contents using wired or wireless communications or off-line.

The subscriber's terminals (clients) 310 and 320 are devices that allow the subscribers to connect to the multimedia contents supplying system 100, request for supplying multimedia contents, and receive multimedia contents. The terminals 310, 320 include TV sets with a set-top box, computers, mobile terminals, although not limited thereto. For example, the contents providers 210, 220 and 230 may be broadcasting stations of different countries or nations. These contents providers 210, 220 and 230 supply news of each nation. The multimedia contents system 100 receives the news from these broadcasting stations and supplies the received news to clients of various nations. In this case, the multimedia contents supplying system 100 may modify the received contents to provide them in various languages and supply the modified contents to the clients. For example, the multimedia contents supplying system 100 may use English as the primary language and support other languages such as Japanese and Chinese.

Figure 2:
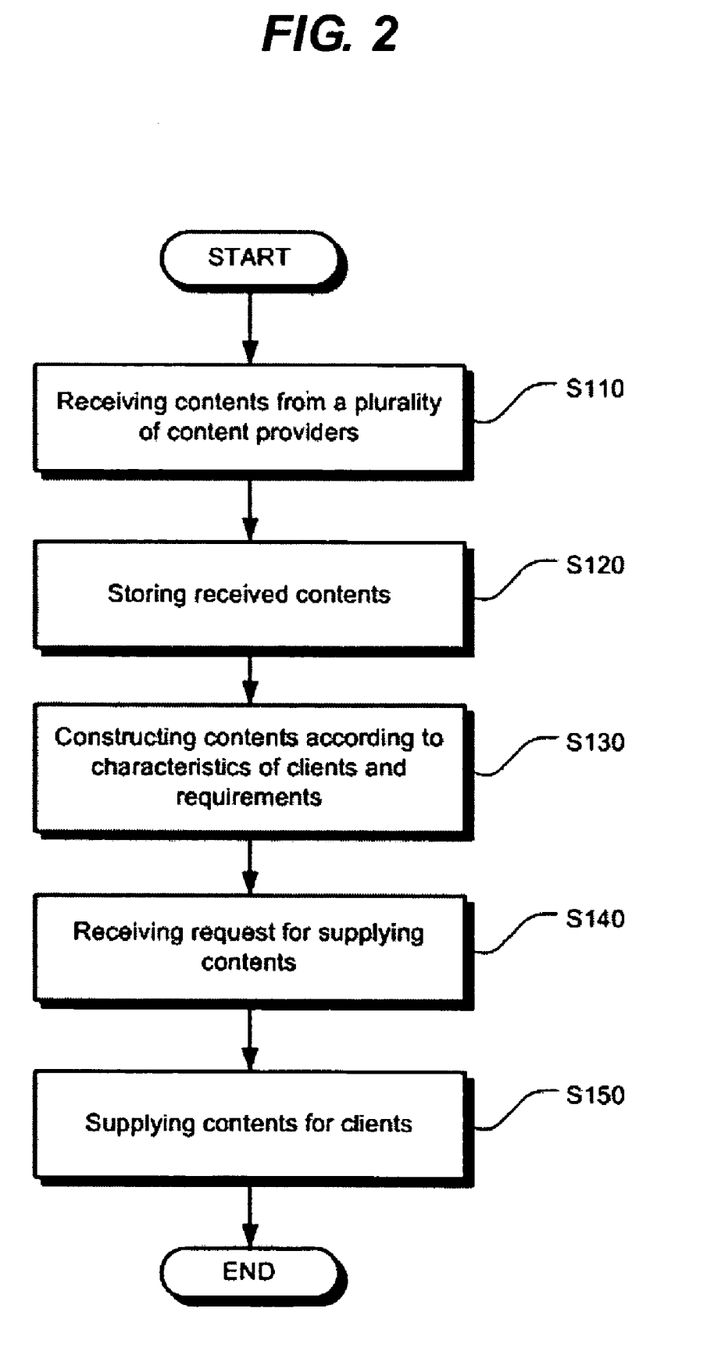
FIG. 2 is a flow chart for a method in accordance with an embodiment of the present invention.

FIG. 2 provides a flow chart for a method in accordance with an embodiment of the present invention. Referring to the drawings, the multimedia contents supplying system 100 receives multimedia contents from a plurality of the contents providers at step S110. At step S120, the received multimedia contents are stored in a storage medium.

The multimedia contents supplying system 100 then modifies the received multimedia contents in view of attributes or instructions of a subscriber(s) or the terminal(s) of the subscriber(s) at step S130. The attributes of the subscribers or terminals may include information such as the age of subscribers, preferences in broadcast programs, hobbies, connection time, the type of terminals (e.g., TV, mobile phones, notebook computers, PDAs,) compression methods decodable by the terminals, the size of the terminal's display, and the terminal's connection method, etc. The instructions or requirements of subscribers may include types and categories of multimedia contents, time for supplying multimedia contents, and transmission target terminals requested by the subscribers. If a request for supplying the multimedia contents is received from the clients at step S140, the requested multimedia contents are supplied to the requesting client in reply to the request at step S150.

Figure 4:
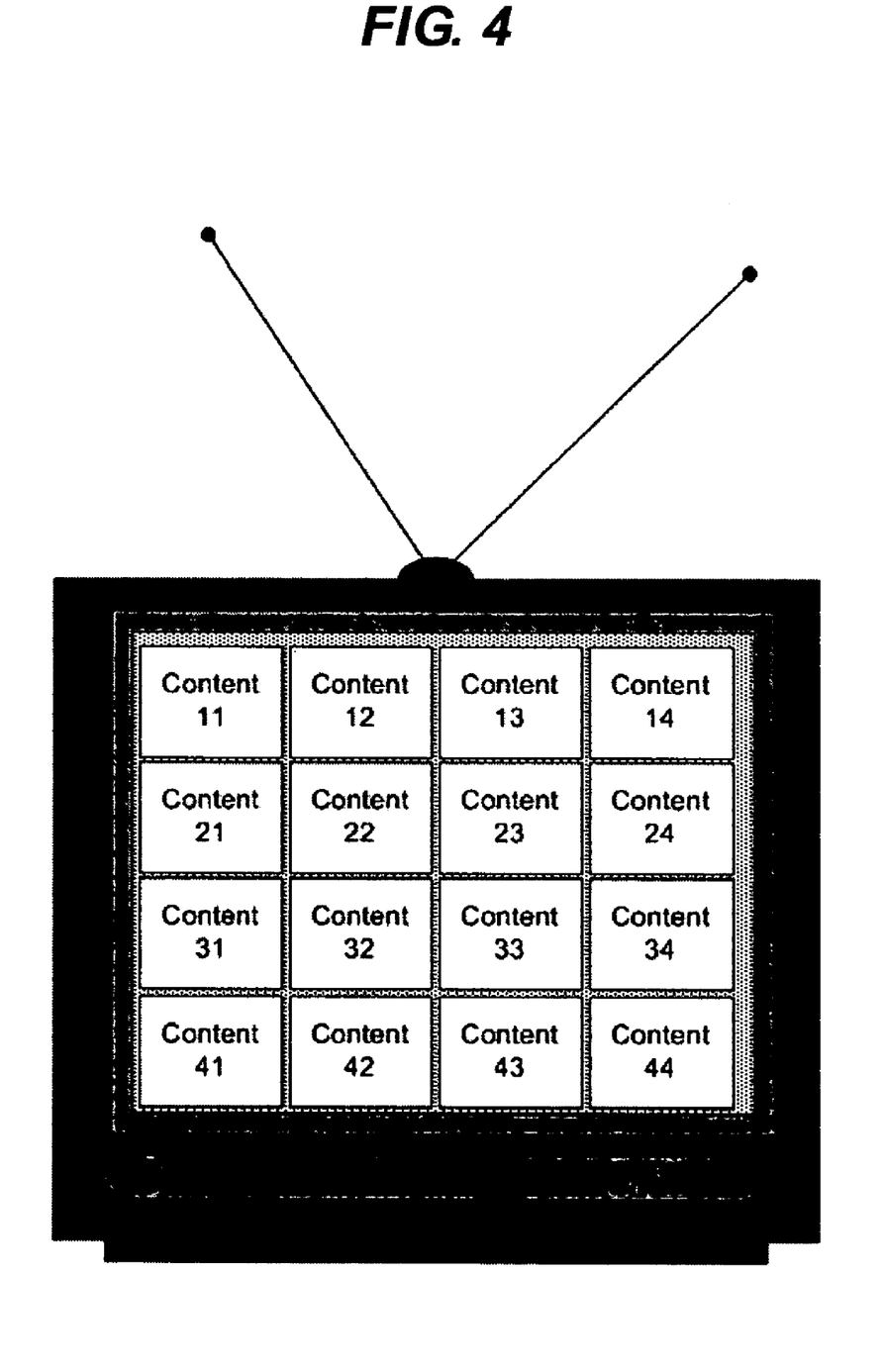
FIG. 4 illustrates a mode of providing a plurality of multimedia contents in an embodiment of the present invention.
Figure 5:
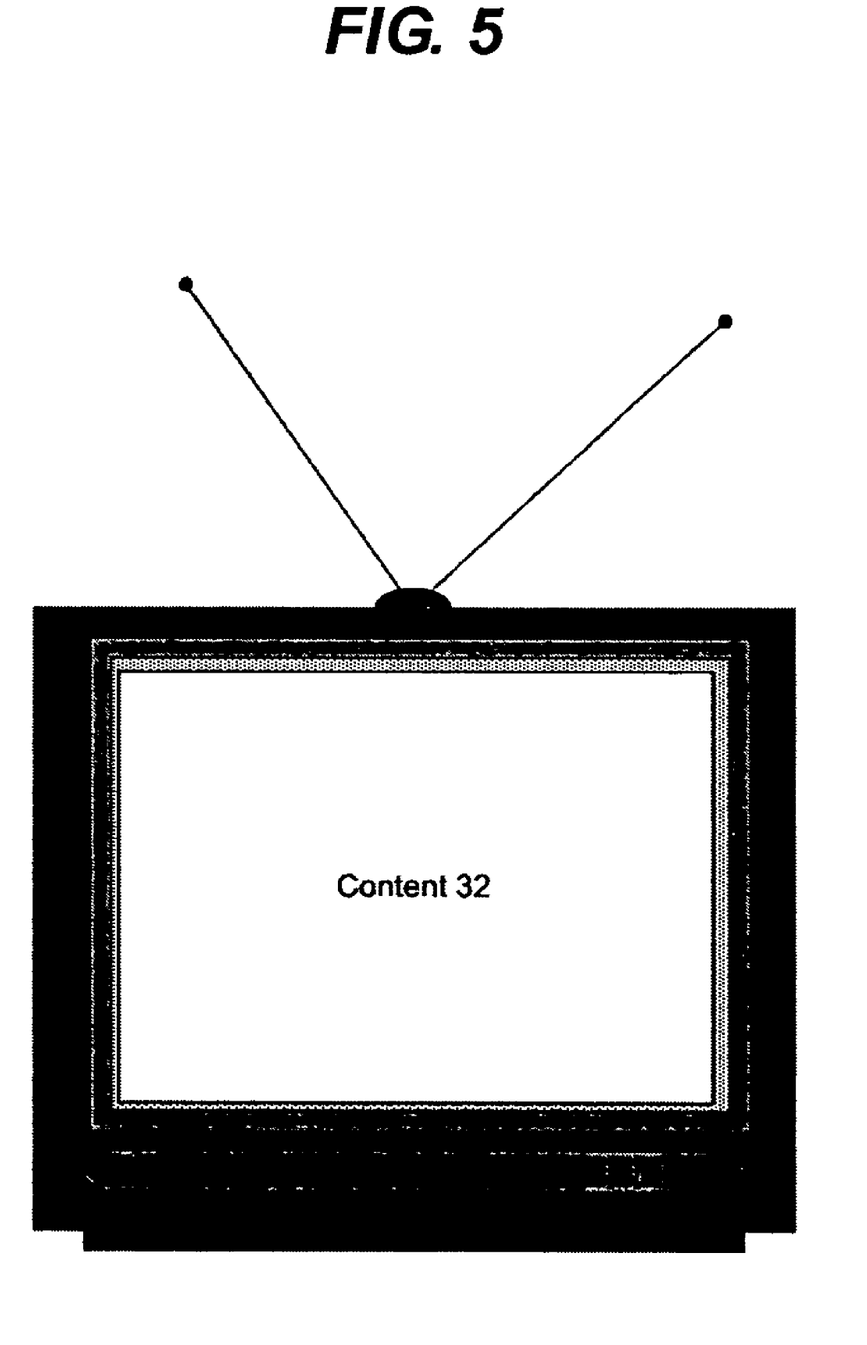
FIG. 5 illustrates a screen when a subscriber selects a content among the plurality of multimedia contents in FIG. 4 in accordance with an embodiment of the present invention.

In the above, the multimedia contents received from the contents providers 210, 220 and 230 may be processed and modified to produce an integrated multimedia content according to an appropriate method. For example, the integrated multimedia content may be constructed in a format, in which a plurality of multimedia contents is simultaneously displayed on a client's terminal as shown in FIG. 4. In this case, the multimedia contents supplying system 100 may receive a request from a client for supplying any one content among the plurality of multimedia contents being displayed simultaneously on the terminal. When receiving such a request, the requested content will be transmitted to the user's terminal as shown in FIG. 5.

Figure 6:
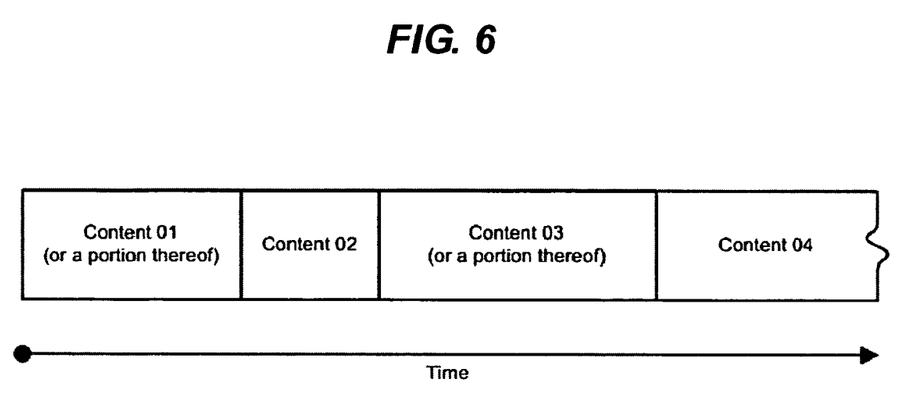
FIG. 6 illustrates another mode of providing a plurality of contents in an embodiment of the present invention.

The integrated multimedia contents may be formed by selecting at least a portion from each multimedia content and configuring the selected portions so that they can be sequentially displayed on a screen. FIG. 6 illustrates such format of the integrated multimedia content. Referring to FIG. 6, the integrated multimedia content may sequentially display all or only a portion from each of the contents.

Meanwhile, the method for modifying or editing to the multimedia contents may be provided by clients or the service provider. For example, the multimedia contents supplying system 100 may receive and store requirements from a client for modifying the contents, and provide services only when the client's requirements are satisfies. Herein, the requirements for modifying or editing the contents may include information such as the type of the contents, time for supplying the contents, etc.

In the foregoing description, the multimedia contents may be supplied real-time, although not limited thereto. The multimedia contents supplying system 100 may supply multimedia contents stored in a storage medium in reply to a request from a client. In this case, the multimedia content supplying system 100 searches and locates the requested multimedia contents among the stored multimedia contents and supplies the same to the client. If the requested multimedia contents are not stored, the system may inform such to the client.

On the other hand, the multimedia supplying service in accordance with an embodiment of the present invention may receive information about the terminal of the client and modify multimedia contents to supply to the client in light of the information about the terminal.

Figure 3:
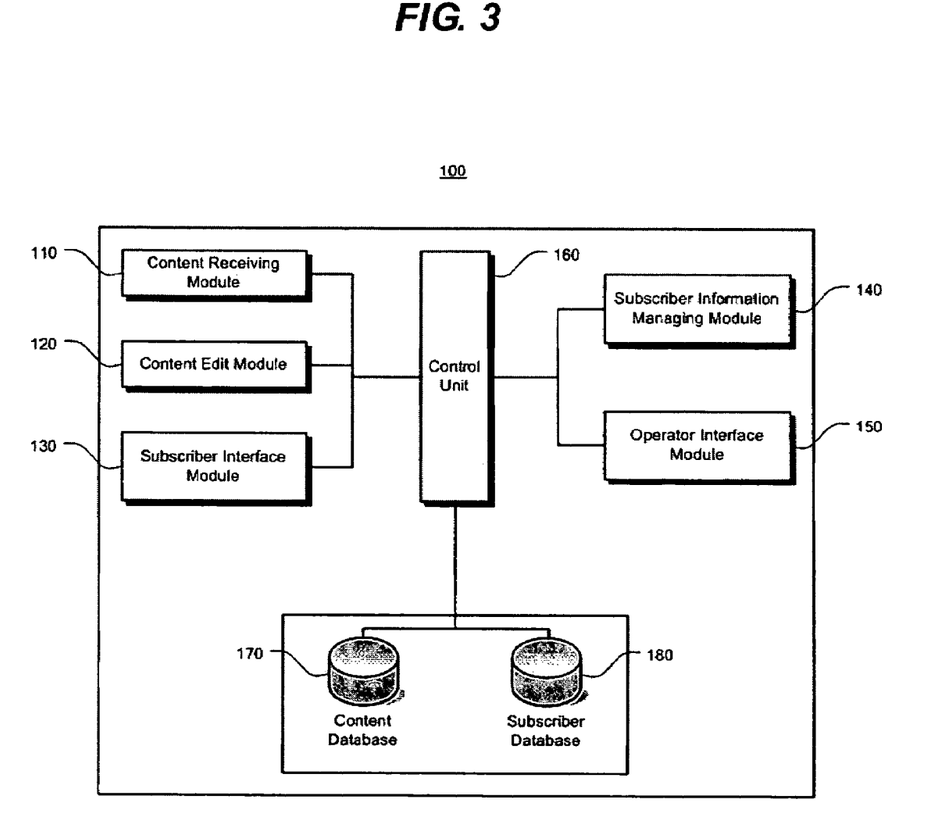
FIG. 3 is a block diagram illustrating a system in accordance with an embodiment of the present invention.

FIG. 3 illustrates a schematic block diagram of a multimedia contents supplying system 100 in accordance with an embodiment of the present invention. As shown in the drawing, the multimedia contents supplying system 100 includes a contents receiving module 110, a modifying (editing) module 120, a subscriber interface module 130, a subscriber information managing module 140, an operator interface module 150, a control unit 160, a contents database 170 and a subscriber information database 180.

The contents receiving module 110 receives the contents from each of the plurality of contents providers 210, 220 and 230. The control unit 160 stores the received contents in the contents database 170. The contents modifying module 120 processes the contents supplied from the plurality of contents providers 210, 220 and 230 or the contents stored in the contents database 170 such that the processed contents are matched with the attributes or the instructions of the client.

The attributes of the clients (subscribers) or terminals may include information such as the age of subscribers, preferences in broadcast programs, hobbies, connection time, the type of terminals, compression methods decodable by the terminals, the size of the terminal's display, and the terminal's connection method, etc. The instructions or requirements of subscribers may include types and categories of multimedia contents, time for supplying multimedia contents, and transmission target terminals requested by the subscribers. Such information is managed by the subscriber information managing module 140. Also, the subscriber information managing module 140 receives a request for supplying the contents from the subscriber and determines whether the received request can be approved or not. Information for each subscriber is stored in the subscriber information database 180.

The subscriber interface module 130 supplies the modified contents in a shape to be supplied to the subscriber and receives requests from the subscriber for supplying of certain contents. The control unit 160 takes charges of various processes relating to the broadcasting service by controlling each of the modules. The operator interface module 150 allows the service provider to access the system 100 so as to manage the data or to adjust processes for providing the service.

Figure 7:
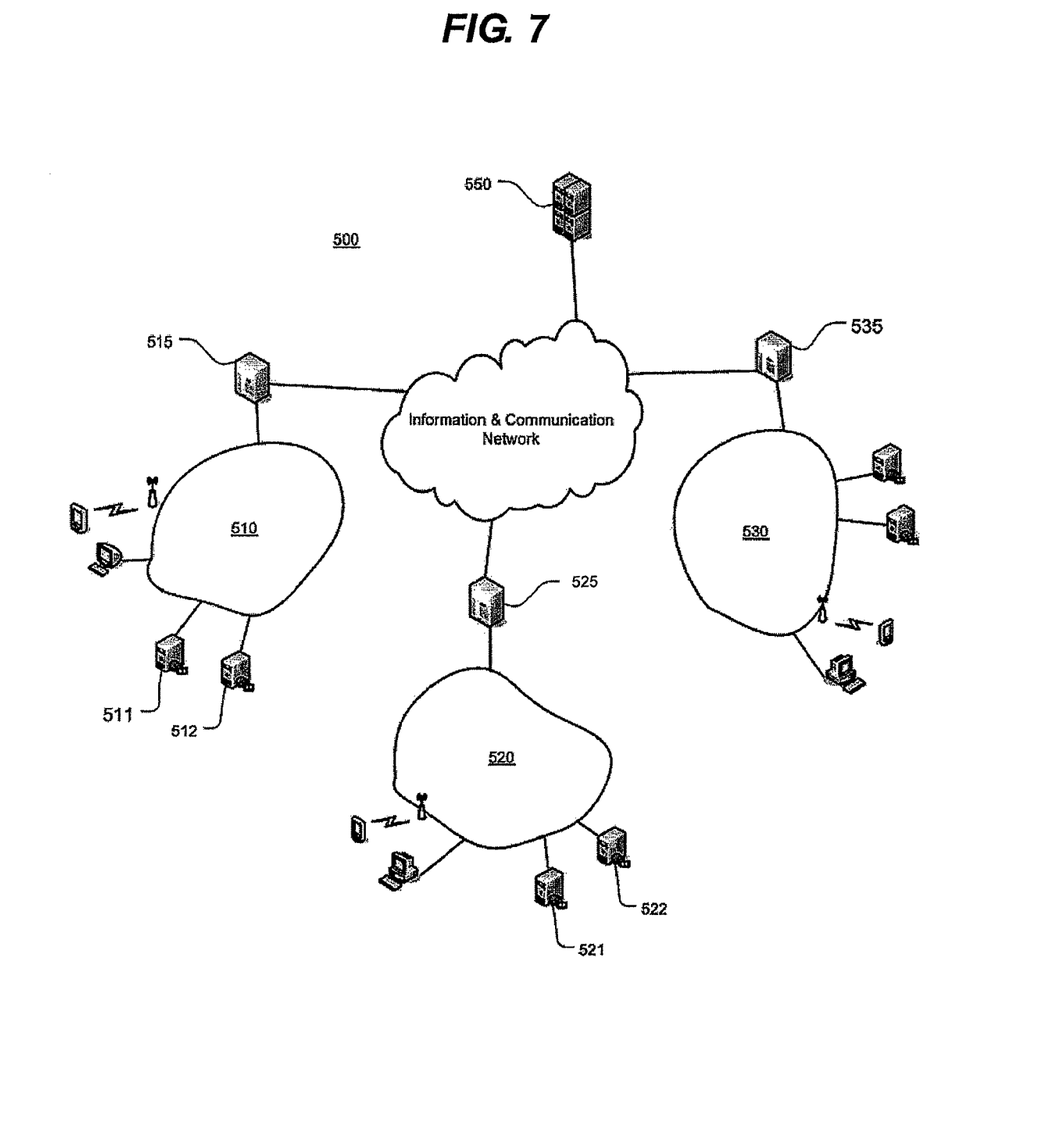
FIG. 7 illustrates a network diagram in accordance with an embodiment of the present invention.

FIG. 7 illustrates a multimedia contents supplying system 500 in accordance to another embodiment of the. present invention. As illustrated, the multimedia contents supplying system 500 is connected to a plurality of contents distribution networks 510, 520 and 530 and a central managing server 550 through an information communication network.

To each contents distribution network 510, 520, 530, a plurality of contents providers 511, 512, 521 and 522 and a plurality of the clients are connected. Each contents distribution network 510, 520, 530 is provided with a plurality of local managing servers 515, 525 and 535 receiving the contents from contents providers 511, 512, 521 and 522 that are connected to each of the contents distribution networks 510, 520 and 530. Although not shown, the plurality of the contents distribution networks 510, 520 and 530 has a plurality of edge servers that receives and stores contents from the plurality of the local managing servers 515, 525 and 535, and supplies the stored contents to the clients.

The central managing server 550 is connected to the plurality of local managing servers 515, 525 and 535 of each of the contents distribution networks 510, 520 and 530, receives and stores contents from the plurality of local managing servers 515, 525 and 535. The central managing server 550 then can supply the contents received from one contents distribution network to the other contents distribution networks.

The contents distribution networks 510, 520 and 530, for example, can be formed for each nation. The contents the contents providers 511, 512, 521 and 522 of each of the contents distribution networks 510, 520 and 530 may include air channel broadcasting stations and Internet broadcasting stations of the corresponding nation. The clients may be subscribers of the nation.

The central managing server 550 collects contents of the corresponding nation from the plurality of local managing servers 515, 525 and 535 that are connected to the plurality of contents distribution networks 510, 520 and 530 of each nation. Then, the central managing server 550 distributes to the plurality of the local managing servers 515, 525 and 535 of the other nation's contents distribution networks 510, 520 and 530. For example, systems disclosed in Korean Patent Publication No. 10-2004-0074403 entitled to "SYSTEM AND METHOD FOR SUPPLYING CDN UNIFIED SERVICE" or Korean Patent Publication No. 10-2004-0073630 entitled to "SYSTEM AND METHOD FOR COMMONLY OWNING CONTENTS BETWEEN CDN SERVICE PROVIDERS" may be applied to the multimedia contents supplying system in accordance with an embodiments of the present invention.

Figure 8:
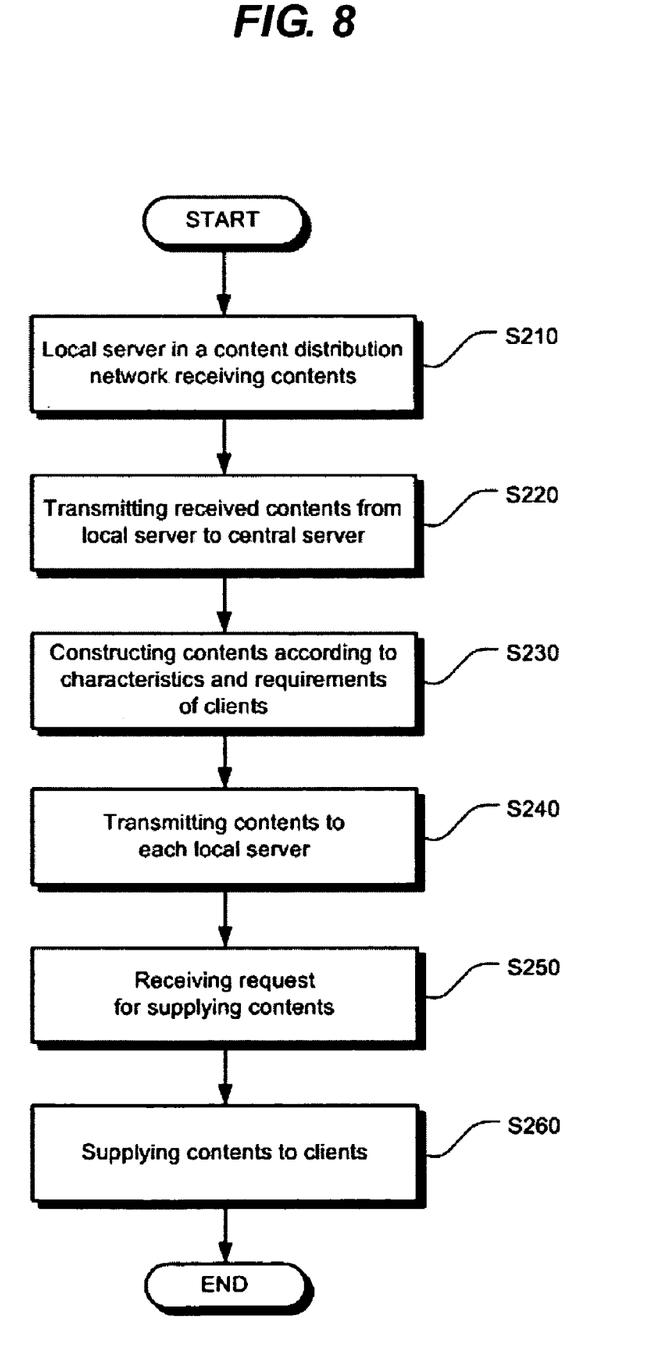
FIG. 8 is a flow chart for a method in accordance with an second embodiment of the present invention.

FIG. 8 illustrates a flow chart illustrating a method for supplying the multimedia contents in the system as shown in FIG. 7. At step S210, a local managing server of each contents distribution network receives the contents from the contents providers connected to the corresponding contents distribution network. The contents can be supplied real-time or at predetermined times. The local managing server of each contents distribution network transmits the received contents to the central managing server at step S220. The central managing server constructs the contents supplied from the local servers in a form that matches the attributes or instructions of certain clients, and transmits the contents to each local server in a multicast method at steps S230 and S240. The central server may omit sending certain contents to local servers that originally transmitted the contents to the central server.

When a request for supplying a content is received from a client (S250), the corresponding content is supplied to the client in reply to the request (S260). The same process described above in connection with the foregoing embodiment can be used in this step.

In accordance with the present invention, the contents supplied by the providers of the plurality of the multimedia contents can be supplied real-time by integrating the plurality of the multimedia contents through one supplying source. Also, users can receive multimedia contents that are configured, modified or edited in desired formats.

While the present invention has been described with respect to certain embodiments, it will be apparent to those skilled in the art that various changes and modifications may be made without departing from the scope of the invention as defined in the following claims.

What is claimed is:

1. A method of providing multimedia contents to a client via a network, the method comprising:
   receiving, by a local server of a contents distribution network, multimedia contents from a plurality of contents providers connected to the contents distribution network;
   transmitting, by the local server, the received multimedia contents to a central server such that the central server processes the transmitted multimedia contents to construct a plurality of pieces of information relating to at least part of the transmitted multimedia contents;
   receiving, by the local server, the plurality of pieces of information from the central server;
   forwarding, by the local server, the plurality of pieces of information to a plurality of clients connected to the contents distribution network;
   receiving a request for supplying a piece of multimedia content from a first one of the plurality of clients, wherein the request further comprises information about a device of the first client on which the requested piece is to be played; and
   supplying to the first client the requested piece of multimedia content configured into a form that the first client's device can play, wherein supplying further comprises:
      determining whether the requested piece is stored in an edge server within the contents distribution network to which the first client is connected,
      if the requested piece is stored in the edge server, coordinating the requested piece to be supplied from the edge server to the first client,
      if the requested piece is not stored at any edge servers within the contents distribution network to which the first client is connected, determining whether the requested piece is stored in a server in another contents distribution network, and
      if the requested piece is stored in another contents distribution network, coordinating the requested piece to be supplied from the other contents distribution network to the first client.

2. The method of claim 1, wherein the information relating to at least part of the transmitted multimedia contents comprises an integrated multimedia content using the transmitted multimedia contents.

3. The method of claim 2, wherein the integrated multimedia content comprises a plurality of pieces of multimedia contents that are to be simultaneously displayed.

4. The method of claim 3, wherein the requested piece of multimedia content is one of the plurality of pieces of multimedia contents that have been simultaneously displayed.

5. The method of claim 2, wherein the integrated multimedia content comprises a portion selected from each of the multimedia contents, and wherein the selected portions are configured to be sequentially displayed.

6. The method of claim 1, wherein the request further comprises:
   identification of the requested piece; and
      a time for supplying the requested piece of multimedia content to the first client.

7. The method of claim 1, wherein each piece of information is forwarded to one or more of the plurality of clients.

8. The method of claim 1, wherein a first one of the plurality pieces of information is forwarded to the first client.

9. The method of claim 8, wherein the request from the first client is in response to the first piece of information forwarded to the first client.

10. The method of claim 8, wherein the first piece of information is formulated based on a previously submitted input of the first client.

11. The method of claim 2, wherein the integrated multimedia content comprises a portion selected from at least part of the multimedia contents received from the plurality of contents providers.

12. The method of claim 11, wherein at least part of the selected portions are configured to be simultaneously displayed on a display.

13. A system for distributing multimedia contents to a client, the system comprising:
   a central server;
   a plurality of local servers, each connected to the central server, a plurality of contents providers, and a plurality of clients via a contents distribution network;
   said each local server being configured:
      to receive multimedia contents from the plurality of contents providers and
      to transmit the received multimedia contents to the central server;
   said central server being configured:
      to process multimedia contents from the plurality of local servers,
      to construct a plurality of pieces of information relating to multimedia contents from the plurality of local servers, and
      to transmit to the plurality of pieces of information to a first one of the plurality of local servers; and
   said first local server configured:
      to forward the plurality of pieces of information to the plurality of clients connected to the first local server,
      to receive a request for supplying a piece of multimedia content from a first one of the plurality of clients, the request comprising information about a device of the first client on which the requested piece is to be played, and
      to supply to the first client the requested piece of multimedia content configured into a form that the first client's device can play, wherein said first local server is further configured:
         to determine whether the requested piece is stored in an edge server within the contents distribution network to which the first client is connected,
         if the requested piece is stored in the edge server, to coordinate the requested piece to be supplied from the edge server to the first client,
         if the requested piece is not stored at any edge servers within the contents distribution network to which the first client is connected, to determine whether the requested piece is stored in a server in another contents distribution network, and if the requested piece is stored in another contents distribution network, to coordinate the requested piece to be supplied from the other contents distribution network to the first client.

14. The system of claim 13, wherein the central server is further configured to formulate the plurality of pieces of information based on previously submitted inputs of the plurality of clients.

15. The system of claim 13, wherein the information relating to at least part of the transmitted multimedia contents comprises an integrated multimedia content using at least part of the transmitted multimedia contents.

16. The system of claim 15, wherein the integrated multimedia content comprises a plurality of pieces of multimedia contents that are to be simultaneously displayed.

* * * * *